United States Patent [19]

Haase

[11] 4,228,777

[45] Oct. 21, 1980

[54] FUEL CONTROL

[75] Inventor: Elmer A. Haase, South Bend, Ind.

[73] Assignee: The Bendix Corporation, Southfield, Mich.

[21] Appl. No.: 8,625

[22] Filed: Feb. 1, 1979

[51] Int. Cl.[3] ........................ F02D 1/04; F02M 39/00; F16K 31/126

[52] U.S. Cl. .................................... 123/454; 123/452; 123/463; 137/500; 251/612; 251/335 B

[58] Field of Search .... 123/139 A, 140 MC, 139 AH, 123/139 AL, 140 FG; 137/500, 503, 505.3, 505.13, 505.29; 251/61.2, 335 B

[56] References Cited

U.S. PATENT DOCUMENTS

| | | | |
|---|---|---|---|
| 2,082,325 | 1/1937 | Cross | 137/505.29 |
| 2,281,417 | 4/1942 | Darby | 251/335 B X |
| 2,301,031 | 11/1942 | Ferguson | 137/505.13 X |
| 2,770,255 | 11/1956 | Goddard | 251/335 B X |
| 3,114,359 | 12/1963 | Haase | 123/139 AL |
| 3,565,109 | 2/1971 | Smith | 251/61.2 X |
| 3,698,369 | 10/1972 | Vuaille | 123/140 FG X |
| 3,707,144 | 12/1972 | Galis et al. | 123/140 FG |
| 3,886,922 | 6/1975 | Frick | 123/140 MC X |
| 3,926,162 | 12/1975 | Haase et al. | 123/139 A |

*Primary Examiner*—Stuart S. Levy

*Attorney, Agent, or Firm*—Leo H. McCormick, Jr.; Ken C. Decker

[57] ABSTRACT

An adjustable bellows mechanism in a fuel control apparatus for balancing the internal forces of a valve arrangement to establish a fuel flow from the control apparatus to an engine corresponding to the optimum operational parameter of the engine.

12 Claims, 4 Drawing Figures

FUEL CONTROL

BACKGROUND OF THE INVENTION

This invention relates to an adjustment mechanism for a fuel control apparatus through which fuel is supplied to an engine.

Such a fuel control apparatus is disclosed in U.S. Pat. No. 3,114,359 wherein the fuel flow to an engine is proportional to the mass air flow of the engine as measured by the forces generated across an air pressure diaphragm and a fuel pressure diaphragm. These forces which are opposite from each other are imposed on a control rod that is connected to a valve that controls the flow of fuel to the engine. It is desirable that all extraneous forces such as spring loads and frictional forces on the control rod be minimized in order to prevent the creation of a force inbalance between the air diaphragm and the fuel diaphragm. In particular, such extraneous forces are a problem when the force derived by the air pressure diaphragm is relatively small as, for example, at engine idle where fuel flow to the engine is at a minimum. One problem area through which such extraneous forces are introduced into the system is the fluid seal on the control rod which separates the pressurized fuel from the air.

In order to reduce the frictional drag imposed by the fluid seal between the fuel and air chamber, a balanced bellows seal as disclosed in U.S. Pat. No. 3,926,162 was devised. This bellows seal is completely adequate and operates effectively over the operating range of the fuel control valve.

As disclosed in U.S. Pat. No. 3,926,162 the position of the valve with respect to the valve seat can be adjusted through the use of shims in order that the valve engages the valve seat when the fuel diaphragm is in its neutral position. Unfortunately, in order to adjust the valve with respect to its valve seat the entire fuel control must be essentially dismantled and the shims installed. Such dismantling does not lend itself to the manufacture of a sufficient number of production units that is ordinarily required to make a profit.

SUMMARY OF THE INVENTION

I have devised an adjustment mechanism for balancing the internal forces of a valve arrangement to provide the optimum fuel for operating an engine within set operational parameters.

The adjustment mechanism includes a bellows that has a first end fixed to the wall that separates an air chamber from a fuel chamber and a second end secured to a retainer that surrounds the control rod, a seal that surrounds the control rod, a spring for holding the seal against the retainer, and a fastener connected to the control rod and engageable with the retainer. The bellows assumes a normal free length, which theoretically is designed such that when the fuel diaphragm is in its neutral position, the valve engages the valve seat.

Depending on the operating parameters of the engine, it may be desirable to modify the fuel flow to the engine in response to a relatively low mass airflow. If more fuel is required to operate the engine than would be available, a first bellows spring force is created in the bellows by moving the second end toward the fuel diaphragm. When the bellows attempts to return to its free length, the first bellows spring force is created. This first bellows spring force is transmitted into the control rod through the fastener causing the valve to move away from the seat a predetermined amount to allow fuel to flow from the fuel chamber.

Similarly, if it is desirable to delay the flow of fluid from the fuel chamber, the fastener is moved on the control rod causing the bellows to be compressed. As the bellows attempts to return to its free length, a second bellows spring force is created that acts on the control rod and urges the valve into engagement with the valve seat. Thereafter the flow of fuel from the fuel chamber is delayed until such time that an air pressure differential force is created across the air diaphragm sufficient to overcome the second bellows spring force.

It should be understood that the effect on fuel flow of both such first and second bellows spring forces is of primary importance when the input force generated by the air pressure is low and proportionally decreases as the input force increases. Thus, when the engine is operating above its idle fuel requirement, the fuel flow is essentially proportional to the mass air flow to the engine.

It is an object of this invention to provide a fuel control with an adjustable bellows for selectively adding or substracting a spring force to balance the spring forces in a valve arrangement to match the fuel flow from the fuel control with the optimum operational parameters of an engine.

It is a further object of this invention to provide a fuel control with an adjustment mechanism to match the fuel flow requirements from a fuel chamber with the optimum operating parameters of an engine.

It is another object of this invention to provide a fuel control for an engine with a resilient member with acts on a fuel valve to modify the effect of a control pressure force. The effect of the resilient member on the fuel valve proportionally decreases as the control pressure force increases when the engine increases from an idle condition to an operational condition.

It is a still further object of this invention to provide a fuel control which is responsive to a mass airflow to an engine with an adjustment mechanism for nulling the spring forces of a valve arrangement by selectively adding or subtracting a bellows spring force to the spring forces and thereby establish a zero fuel flow through the valve arrangement when the mass airflow is zero.

These and other objects should be apparent from reading this specification and viewing the drawings.

DETAILED DESCRIPTION OF THE INVENTION

Figure 1:
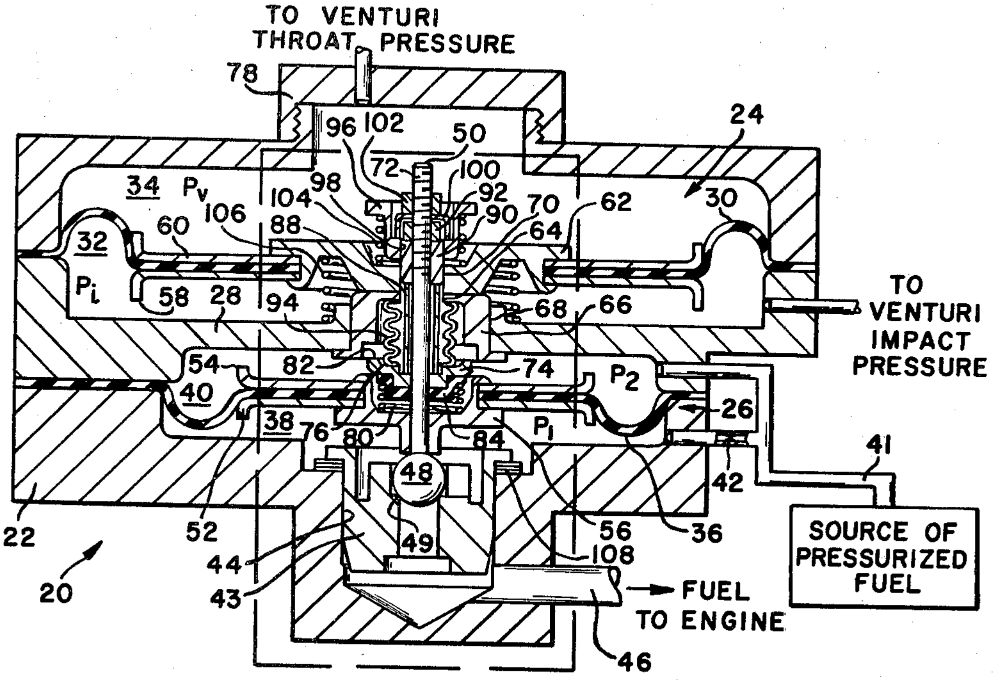
FIG. 1 is a sectional view of a fuel control apparatus made according to the principles of this invention.
Figure 2:
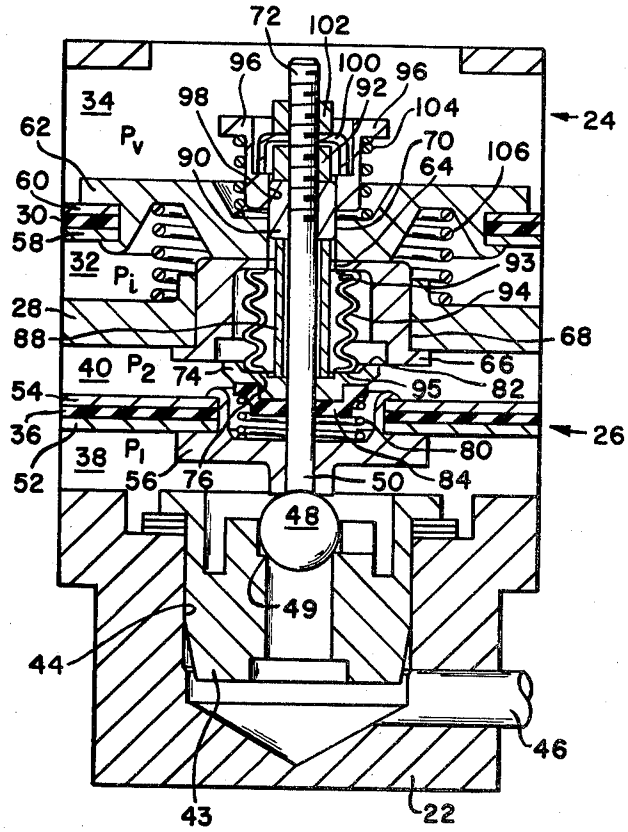
FIG. 2 is an enlarged view of the circumscribed section 2 of FIG. 1.

Referring to FIGS. 1 and 2, numeral 20 represents a portion of a fuel metering unit shown and described in detail in the heretofore mentioned U.S. Pat. Nos. 3,114,359 and 3,926,162 to which reference is made for specific details not necessary to fully understand the present invention.

In general, the portion of the fuel metering section shown in FIGS. 1 and 2 includes a multisection casing 22 having an air section 24 and a fuel section 26 separated by a wall 28.

The air section 24 includes a diaphragm 30 fixedly secured at its outermost portion to casing 22 for separating a chamber 32 from a chamber 34. Chambers 34 and 32 are vented to venturi throat air pressure $P_v$ and impact air pressure $P_i$, respectively, $P_v$ is derived from a venturi, not shown, through which airflow to the engine is directed and $P_i$ is substantially equal to the air pressure in the surrounding environment.

The fuel section 26 includes a diaphragm 36 fixedly secured at its outermost portion to casing 22 and separating a chamber 38 from a chamber 40. Chambers 38 and 40 communicate with pressurized fuel at pressures $P_2$ and $P_1$, respectively, in a fuel supply conduit 41 supplying pressurized fuel to chamber 38. Fuel pressures $P_1$ and $P_2$ are derived from the upstream and downstream sides of restriction 42 located in conduit 41. The fuel pressure differential $P_1-P_2$ across the restriction 42 determines the rate of metered fuel flow through conduit 41.

The chamber 38 is provided with a fuel outlet defined by an annular valve seat member 43 fixedly secured in an opening 44 of casing 22 by any suitable means such as a press fit. The opening 44, in turn, discharges fuel to a passage 46 which supplies fuel to an engine, not shown.

The effective flow area of the valve seat is controlled by the position of a ball valve 48 and seating surface 49. The ball valve 48 is fixedly secured to one end of rod or actuating stem 50 and is positioned relative to valve seat 43 in response to a force balance derived from diaphragms 30 and 36 in a manner fully described in U.S. Pat. No. 3,114,359, which is incorporated herein by reference.

The fuel diaphragm 36 is provided with backing plates 52 and 54 which are clamped against opposite sides thereof by a retaining member 56 suitably upset or otherwise connected to provide a rigid assembly. The rod 50 is axially aligned with valve seat member 48 by being fixedly secured to retaining member 56 by any suitable means such as brazing or the like.

The air diaphragm 30 is provided with backing plates 58 and 60 clamped against opposite sides thereof by a retaining member 62 suitably upset or otherwise connected to provide a rigid assembly.

The rod 50 extends through an opening 64 in a cup-shaped fitting 66 which, in turn, is fixedly secured in an opening 68 in wall 28 by any suitable means such as a press fit to provide a fluid seal between fuel chamber 38 and air chamber 32. The rod 50 which also extends through a central opening 70 in retaining member 62 has a threaded portion 72 on the end thereof.

A circular fitting 74 through which rod 50 extends is provided with an annular recess 76 partially defined by a radially extending flange the outermost portion of which is angled to define a stop portion 82 engageable with fitting 66 to thereby limit axial travel of rod 50 accordingly. An annular flexible seal 84 is urged against annular recess 76 by a spring 80 to provide a fluid seal therebetween.

The fitting 74 is urged against seal 84 by a sleeve 88 slidably received on rod 50. An annular spacing member 90 slidably received on rod 50 bears against sleeve 88 and is secured in fixed position by a lock nut 92 threadedly secured on threaded portion 72. The spacing member 90 is received by opening 70 in retaining member 62 with sufficient clearance provided between the adjacent walls of spacing member 90 and retaining member 62 to allow slidable movement therebetween with a minimum of air leakage therethrough from chamber 34 to chamber 32.

An adjustable bellows 94 surrounding rod 50 is fixedly secured at opposite ends to fitting 66 and fitting 74, respectively, by suitable means such as soldering or the like to provide a positive seal against fluid leakage between air and fuel on opposite sides of bellows 94. The bellows 94 is relatively small is diameter and formed of a suitable layer of thin metal to reduce to a minimum the spring rate of bellows 94. Limits to compression and expansion of bellows 94 are established by engagement of stop 82 with fitting 66 and seating of valve 48 against surface 49 of seat member 43, respectively. The mean effective area of bellows 94 is selected to equal the flow area of valve seat 43 which results in the force derived from pressure $P_2$ acting against valve 48 and tending to seat the same being equalized by an opposing substantially equal force.

An annular spring retaining member 96 having a central opening 98 equivalent in diameter to that of opening 70 in retaining member 62 surrounds spacing member 90. A cup-shaped member 100 slidably received by rod 50 is arranged with its rim portion abutting annular retaining member 96. A lock nut 102 mated with threaded portion 72 holds cup-shaped member 100 and retaining member 96 in a fixed position on rod 50. A compression spring 104 interposed between retaining member 96 and retaining member 62 provides a predetermined force preload which urges the same apart. A compression spring 106 interposed between wall 28 and diaphragm 30 imposes a predetermined force preload on diaphragm 30 in opposition to compression spring 104.

The compression spring 106 corresponds to the "constant effort" spring shown and described in incorporated U.S. Pat. No. 3,114,359. In general, spring 106 serves to maintain a substantially constant preload against diaphragm 30 and assists the $P_1-P_2$ pressure differential across diaphragm 30 to maintain a substantially constant linear relationship between the fuel pressure differential $P_1-P_2$ and the air pressure differential $P_i-P_v$ at relatively low values of air pressure differential.

The compression spring 104 corresponds to the "constant head" spring shown and described in U.S. Pat. No. 3,114,359. The spring 104 is extended at low air flow when the air pressure differential $P_i-P_v$ across diaphragm 30 is correspondingly low. This extension results in retaining member 62 being biased against casing 22 which acts as a stop. The opposite end of spring 104 which bears against retaining member 96 serves to load stem 50 in a direction to open ball valve 48. The pressure differential $P_1-P_2$ across diaphragm 36 required to balance the force of spring 104 results in a rich fuel mixture at engine idle speeds.

MODE OF OPERATION OF THE INVENTION

In order to calibrate the regulator 20 whereby a desired fuel flow is supplied to an engine corresponding to the mass airflow it is necessary that the internal spring forces created by the diaphragms 30 and 36 and the variations in the flow area of surface 49 and the mean effective area of the bellows 94 be balanced with each other without being influenced by the constant head spring 104 which can be varied to meet different engine requirements. If the internal forces of the regulator 20 are balanced on assembly, when fuel is supplied to chambers 40 and 38, valve 48 remains stationary and fuel flow from chamber 38 is zero. This balance condition is illustrated by point 120 in FIG. 4 where the input and output forces acting on the control rod 50 are equal.

Unfortunately, because of variations due to tolerances, the mean effective area of surface 49 and the bellows 94 do not always match each other and the spring rates and effective area of diaphragms 30 and 36 can also vary such that ball 48 is not seated on surface 49 when the input force generated by the venturi suction input force is zero.

In order to assure that ball valve 48 engages surface 49 in the null position, fuel is supplied to the fuel supply chamber 40 and fuel flow chamber 38. Without any input signal, the flow of fuel past valve 48 and surface 49 is measured. If this flow exceeds set specifications, it is necessary to selectively choose shims 108 of different sizes to change the position of the annular valve seat 43 in opening 44. This method of nulling is time consuming since the annular valve seat member 43 must be removed from casing 22 whenever a shim 108 change is required. This dismantling does not lend for the manufacture of quantities required to establish a profitable operation.

The adjustable bellows 94 disclosed in this invention reduces the time involved in establishing the null position for the internal spring forces in the regulator 20 to assure that zero flow occurs with a zero input force from the air diaphragm 30.

In order to calibrate regulator 20, a fuel is supplied to the fuel supply chamber 40 and the fuel flow chamber 38. If any fuel is flowing from the regulator 20 in passage 46, this indicates that the internal forces of the diaphragms 30 and 36, and bellows 94 are not balanced and as a result ball valve 48 is seated on surface 49. Since we are calibrating the regulator with zero input from the venturi or $P_v=0$, cap 78 is removed from casing 22 to allow the constant head spring 104 and associated retainer 96 to be disconnected from the control rod 50. Thereafter, the internal forces of the regulator 20 are modified through the introduction of spring force derived from the adjustable bellows 94. This adjustment is achieved by turning nut 92 with respect to threads 72 on stem 50 to move the sleeve 88 toward retaining member 56. End 93 of the adjustable bellows 94 is fixed to fitting 66 attached to wall 28 and while end 95 is free to move on control rod 50. Thus, the adjustable bellows 94 is extended from its normal free length position to a different position. Thereafter, when the bellows 94 attempt to return to its free length, a bellows spring force is established. In returning to its free length, the bellows spring force is transmitted from fitting 74 through sleeve 88 and into nut 92 for moving the diaphragm 36 closer to seal 84.

Thereafter, when fuel is supplied to the regulator 22, the fluid pressure $P_2$ acts on the diaphragm 36 to urge ball valve 48 toward surface 49. However, as ball valve 48 is urged toward surface 49, end 95 of the adjustable bellows 94 is extended causing a bellows spring force to be created. This bellows spring force is designed to accurately balance the internal forces. However, if the initial introduced spring force from the bellows 94 is insufficient to exactly balance the internal forces, it is necessary to further modify the position of end 95 with respect to end 93 of the bellows. When the internal spring forces of the valve arrangement are balanced, the fuel flow from the control apparatus 20 is zero with a zero airflow to the engine.

In the starting sequence for the engine, a starter motor drives the shaft connected to the pistons causing air to flow through a venturi into the intake manifold of the engine for distribution to the cylinders. As the pistons move in the cylinders, valves sequentially open and close to allow air and fuel to flow into the cylinders which is combusted and thereafter the exhaust gases expelled to the surrounding environment.

For each engine, a fuel-to-air (F/A) ratio can be calculated which theoretically produces the optimum power output. This F/A ratio for an engine is illustrated by line 122 in FIG. 3 which corresponds to line 130 in FIG. 4 showing the relationship of the venturi suction input of diaphragm 30 to the metering head output of diaphragm 36.

Experience has shown that engines require a richer F/A ratio when they are operated at low speeds such as from start-up to idle. Thus, the constant head spring 104 acts on the control rod 50 to provide an input force which aids the air pressure differential force ($P_i-P_v$ mean effective area of diaphragm 30) in moving the ball valve 48 away from seat 49 to allow fuel to flow from the regulator 20 to the engine.

Figure 3:
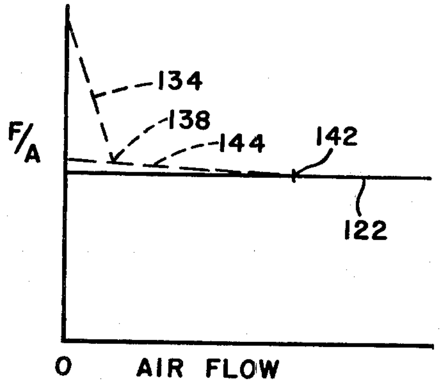
FIG. 3 is a graph illustrating the fuel-to-air ratio associated with the mass airflow to an engine.

Since the force generated by the pressure differential $P_i-P_v$ across diaphragm 30 is initially small, the input force of the constant head spring 104 has an immediate effect on the F/A ratio as shown by line 134 in FIG. 3. However, as $P_i-P_v$ across diaphragm 30 increases, the constant head spring 104 is overcome, as shown by points 136 and 138 in FIGS. 3 and 4, respectively, and retainer 62 engages retainer 96 to establish a substantially solid link between diaphragms 30 and 36 through rod 50.

Figure 4:
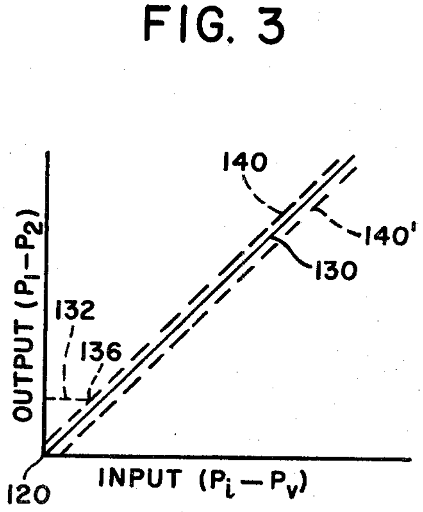
FIG. 4 is a graph illustrating the venturi suction input force to the metering head output force for operating the fuel control apparatus.

In order to assure that a substantial linear relationship exists between the force generated by the air pressure differential $P_i-P_v$ and the fuel pressure differential $P_2-P_1$ the constant effort spring 106 provides an input force to the control rod 50 as illustrated by line 140 in FIG. 4. The input force generated by the constant effort spring effects the F/A ratio as compared to the mass airflow in a manner illustrated by line 144 in FIG. 3.

As shown in FIG. 4, the input force of the constant effort spring is added to the input force of the mass airflow signal generated across diaphragm 30. Under some conditions it may be desirable to modify the input force of the mass airflow to produce an operational curve illustrated by line 140'. This modification can be achieved by having the constant effort spring act on diaphragm 36. However, for most applications since operational air pressure differential is relatively small with low mass airflow to the engine, the constant effort spring 106 is located as shown in FIGS. 1 and 2.

The effect of the constant effort spring 106 on the F/A ratio is proportionally reduced as the mass airflow through the venturi increases with an increase in engine speed. When some volume of airflow is presented to the engine, the force, illustrated by point 142 on line 122, of the constant effort spring on the F/A ratio is considered negligible. However, as shown in FIG. 3, during the start-up of the engine, the F/A ratio is modified by the forces generated of the constant effort spring 106, constant head spring 104 and the bellows spring force in order that the optimum power can be developed by the engine.

During the calibration of the regulator 20 if the thickness of the shims 108 selected to move the annular seat member 43 are such that ball valve 48 engages surface 49 before casing 22 is clamped together, the bellows 94 is compressed. Now during the operation of the regulator 20, the bellows force must be overcome before any fuel is transmitted to the engine through conduit 46 even though an air pressure differential $P_i - P_v$ is created through the flow of air to the engine.

Thus, the internal spring forces must be reduced in order to establish the null position 120. This adjustment is achieved through the repositioning of end 95 with the control rod 50 which $P_2 = P_1$ and ball valve 48 is seated on surface 49. To reposition end 95, nut 92 is moved on threaded section 72 of rod 50 away from diaphragm retainer 56 to allow the bellows 94 to approach its free length. At the same time, rod 50 moves the ball valve 50 away from seat 49 to establish the nulling position for the regulator 22. Thereafter the input force generated by the air pressure differential should follow line 130 and the regulator operates to allow fuel to flow to the engine in a manner to establish a F/A ratio versus mass airflow as illustrated in FIG. 3.

I claim:

1. In a fuel control apparatus having a valve fixed to a first diaphragm and connected to a second diaphragm by a linkage arrangement, said first diaphragm separating a fuel section into a fuel flow chamber and a fuel supply chamber, said second diaphragm separating an air section into an airflow chamber and a static air chamber, said second diaphragm responding to mass airflow to an engine that creates an airflow pressure differential between the airflow chamber and the static chamber to provide the linkage arrangement with an air input force for moving the valve with respect to a seat and allow fuel to flow from the fuel flow chamber, the fuel flow from the fuel flow chamber creating a fuel flow pressure differential between the fuel flow chamber and the fuel supply chamber to develop a fuel input force that acts on the first diaphragm to oppose the air input force and thereby match the fuel flow from the fuel flow chamber with the mass air flow to establish a fuel to air ratio corresponding to the optimum operational parameter of the engine, the improvement comprising:

adjustment means connected to the linkage members for balancing internal spring forces associated with first and second diaphragms to assure that the fuel flow from the fuel chamber is zero when the mass airflow to the engine is zero.

2. In the fuel control apparatus, as recited in claim 1, wherein said linkage arrangement includes:

a control rod having a first end fixed to said first diaphragm and a second end that extends through a wall that separates the fuel section from the air section; and a fastener for connecting the second end of the control rod to said second diaphragm.

3. In the fuel control apparatus, as recited in claim 2, wherein said adjustment means includes:

a bellows surrounding said control rod, said bellows having a first end fixed to said wall and a second end;

a seal member adjacent said second end of the bellows to prevent fluid communication from the fuel supply chamber through said wall; and a projection member for connecting the second end of the bellows and said fastener, said fastener being movable with respect to said control rod to correspondingly move the second end of the bellows with respect to said wall, said second end thereafter in attempting to return to its free length introducing a bellows spring force into the control rod which is integrated into the internal spring forces of the first and second diaphragms to assure that the fuel flow to the engine is within the optimum operational parameters for the engine.

4. In a fuel control apparatus having a housing with an air section and a fuel section separated by a wall, a first diaphragm located in the air section and connected to a second diaphragm located in the fuel section by a linkage arrangement that extends through the wall, a valve connected to said second diaphragm for controlling the flow of fuel from the fuel section to an engine, said first diaphragm being responsive to a control pressure differential indicative of a mass airflow communicated to the engine for providing the linkage arrangement with an input force which moves said valve and allows fuel to flow to the engine, said second diaphragm being responsive to a fuel pressure differential indicative of the fuel supplied to the engine for providing the linkage arrangement with an operational force that opposes the movement of said valve and thereby supply the engine with metered fuel that is proportional to the mass airflow, said first and second diaphragms having internal spring forces that are transmitted into said linkage arrangement, the improvement comprising:

adjustment means connected to said linkage arrangement for providing a corrective spring force to nullify said internal spring forces and thereby match the fuel flow to the engine with the mass airflow in a ratio corresponding to the optimum operational parameters of the engine.

5. In a fuel control apparatus having a housing with an air section and a fuel section separated by a wall, a first diaphragm located in the air section and connected to a second diaphragm located in the fuel section by a linkage arrangement that extends through the wall, a valve connected to said second diaphragm for controlling the flow of fuel from the fuel section to an engine, said first diaphragm being responsive to a control pressure differential indicative of a mass airflow communicated to the engine for providing the linkage arrangement with an input force which moves said valve and allows fuel to flow to the engine, said second diaphragm being responsive to a fuel pressure differential indicative of the fuel supplied to the engine for providing the linkage arrangement with an operational force that opposes the movement of said valve and thereby supply the engine with metered fuel that is proportional to the mass airflow, the improvement comprising:

adjustment means connected to said linkage arrangement for positioning said valve with respect to a valve seat corresponding to the optimum fuel flow associated with the operational parameters of the engine.

6. In the fuel control apparatus, as recited in claim 5, wherein said linkage means includes:

a control rod having a first end fixed to said second diaphragm and a second end that extends into said air section;

a first retainer member connected to the second end;

a first spring located between the retainer member and said first diaphragm, said first spring providing a constant force between said first diaphragm and said control rod to urge said valve away from the valve seat.

7. In the fuel control, as recited in claim 6, wherein said adjustment means includes:

a bellows surrounding said control rod and having a first end fixed to said wall and a second end;

a second retainer surrounding said control rod and fixed to said second end of the bellows;

a second spring located between said second retainer and said second diaphragm; and a fastener member engageable with said bellows and secured to said control rod for positioning said second end of the bellows with respect to said second diaphragm, said bellows having a free length such that on engagement thereof by said fastener the second diaphragm is in a neutral position with said valve touching the valve seat to prevent communication of fuel to the engine.

8. In the fuel control, as recited in claim 7, further including:

a seal located between said second retainer and said second spring for preventing communication between said fuel section and said air section through said bellows.

9. In the fuel control, as recited in claim 8, wherein said fastener member is moved toward said second diaphragm creating a first spring force in said bellows as said bellows attempts to return to its free length, said first spring force being communicated into said control rod through said fastener member to move said valve away from said valve seat and allow fuel to flow to the engine to meet a predetermined operational parameter of the engine.

10. In the fuel control, as recited in claim 9, wherein the effect of the first spring force on the position of said valve with respect to the valve seat proportionally decreases as said input force created by the control pressure differential across said first diaphragm increases.

11. In the fuel control, as recited in claim 9, wherein said fastener member is moved away from said second diaphragm creating a second spring force in said bellows as said bellows attempts to return to its free length, said second spring force being communicated into said control rod through said fastener member to urge said valve toward said valve seat, said input force developed across the first diaphragm and acting on said control rod being required to overcome both the second spring force and the operational force developed across the second diaphragm before fuel flows from the fuel chamber to meet a predetermined operational parameter.

12. In the fuel control, as recited in claim 11, wherein the effect of the second spring force on the position of said valve with respect to the valve seat proportionally decreases as said input force created by the control pressure differential across said first diaphragm increases.

* * * * *